United States Patent [19]

Lin

[11] Patent Number: 5,689,726

[45] Date of Patent: Nov. 18, 1997

[54] COMPUTER SYSTEM INTERFACE ADAPTER CAPABLE OF AUTOMATIC SELF-CONFIGURATION AND SELF-DIAGNOSIS BEFORE OPERATING SYSTEM INITIATION

[75] Inventor: Shu-Chu Lin, Hsinchu Hsien, Taiwan

[73] Assignee: United Microelectronics Corporation, Hsinchu, Taiwan

[21] Appl. No.: 433,724

[22] Filed: May 3, 1995

[51] Int. Cl.[6] .................................................. G06F 13/00
[52] U.S. Cl. .................................. 395/830; 395/183.12
[58] Field of Search ................................. 395/281–284, 395/828–830, 700

[56] References Cited

U.S. PATENT DOCUMENTS

| | | | |
|---|---|---|---|
| 4,556,953 | 12/1985 | Caprio et al. | 395/282 |
| 4,589,063 | 5/1986 | Shah et al. | 395/828 |
| 5,257,387 | 10/1993 | Richek et al. | 395/800 |
| 5,274,771 | 12/1993 | Hamilton et al. | 395/829 |
| 5,335,329 | 8/1994 | Cox et al. | 395/282 |
| 5,355,489 | 10/1994 | Bealkowski et al. | 395/700 |
| 5,386,567 | 1/1995 | Lien et al. | 395/700 |
| 5,418,960 | 5/1995 | Munroe | 395/700 |

*Primary Examiner*—Jack B. Harvey
*Assistant Examiner*—Sumati Lefkowitz
*Attorney, Agent, or Firm*—Ladas & Parry

[57] ABSTRACT

A self-configuring and self-diagnosing computer system interface adapter for installation in the system expansion bus and for self-configuring and self-diagnosing prior to operating system initialization. The interface adapter, along with its own ROM memory device and control program stored thereon, is accessible by the host CPU via the system expansion bus for implementing an automatic self-configuration procedure for incorporation of the interface adapter into the computer system. This self-configuration procedure is implemented before the computer system initiates the operating system. The interface adapter also includes an I/O register device accessible by the CPU via the expansion bus for setting up the I/O address range and interrupt channel assignments under CPU control and a detector for detecting the utilization status of available computer system interrupt channels (both procedures are performed during the self-configuration procedure). The self-diagnosing procedure tests adapter board functionality.

18 Claims, 6 Drawing Sheets

COMPUTER SYSTEM INTERFACE ADAPTER CAPABLE OF AUTOMATIC SELF-CONFIGURATION AND SELF-DIAGNOSIS BEFORE OPERATING SYSTEM INITIATION

BACKGROUND OF THE INVENTION

1. Field of the Invention

The present invention relates in general to functional interface adapters for computer systems. In particular, the present invention relates to functional interface adapters for computer systems capable of completing automatic self-configuration and self-diagnosis procedures before the operating system of the host computer system is initiated.

2. Technical Background

Modern computer systems, in particular, microprocessor-based computer systems, typically employ a system expansion bus for adding peripheral interface adapters with which the computer system may not have been originally equipped. This capability permits the computer system user to have the ability to purchase a minimum configuration system, reducing initial costs, and subsequently being able to add to the system later whatever additional functionality is needed or is affordable.

The idea of optionally, and in a later stage, adding extra functionality that is not absolutely needed in a computer system initially is important to the flexibility of modern commercially available computer systems. In fact, this functional expansion flexibility is one of the most important reasons for the wide-acceptance of the present-day microprocessor-based personal computer systems.

The subsequent expansion of the computer functionality via the addition of the interface adapter boards, however, introduces certain problems in the process of the expansion itself. The added interface adapters must be smoothly incorporated with the existing computer system that may already have expansion interface adapters resident therein. Problems can arise involving the identification of the functionality of the interface adapters and the technical parameter adjustments needed for the successful addition of the particular interface board. For example, microprocessor-based computer systems widely in use today, such as the popular 80 ×86-based systems employing the ISA (industry standard architecture), EISA (enhanced ISA), MCA (micro channel architecture), VESA (video equipment standard association), and PCI (peripheral component interconnect) expansion bus architectures, has limited ability to accept more than a handful of expansion functions. This is particularly true in the case of the ISA, and the VESA and PCI enhancements to the ISA computer systems that dominate the market today. In the case of ISA-based and VESA or PCI-enhanced ISA computer systems, some of the problems lie not in the limitation to the versatility of the functions added, but in the limited number of expansions these systems can sustain. A user must be able to identify the presence of the current interface adapter boards and know what vacancies are still available before the addition of a planned interface adapter board. Problems can arise invovlving the identification of the functionality of the interface adapters and the technical parameter adjustments needed for the successful addition of The particular adjustments board. For example micropressor-base computer systems widely in use today, such as the popular 80×86-based systems widely in use today (industry standard architecture),Eisa (enhanced ISA), MCA (micro channel architecture), EISA (video equipment standard association), and PCI (peripheral component interconnect) expansion bus architecturers, has limited ability to accept more than a handful of expansion functions. This is particularly true in the case of the ISA, and the VESA and PCI enhancements to the ISA computers systems that dominate the market today. In the case of ISA-based and VESA or PCI-enhancements ISA computer systems, some of the problems lie not in the limitation to the versalitity of the functions added, but in the limited number of expansions these systems can sustain. A user must be able to identify the presence of the current interface adapter boards and know what vacancies are still available before the addition of a planned interface adapter board.

In other words, it is frequently the situation that users are trying to squeeze into a system many more expansion interface adapters than the total number allowed. In some cases, more than one adapter is forced to share the same assignment in the expansion channel. Care must be taken to avoid the conflict of these added interface inadequate configuration of the entire system involving possible conflicts in the expansion adapters may not necessarily lead to system crash, however, there is always the chance that the system will crash causing data to be lost.

What complicates the problem is that expansion interface adapters are intended to be added to the systems by the computer system user. The process of adding an interface adapter to a computer system normally requires an understanding of the basic computer system operational principles. However, in the case of the more popular microcomputers in use today, such as the Intel 80 ×86-based ISA computer system, it is frequently the case that even experienced users can get confused in the process of installing an expansion interface adapter. This stems from the fact that several procedural steps must be completed without flaw to secure a successful functional expansion of the computer system.

To successfully install an expansion device into a computer system an investigation must first be conducted to see what expansion channel is still available in the system to incorporate the planned expansion. This requires the user to know what is already in the system, and what expansion channel assignments they normally have. When it is decided that an available expansion channel exists, the user must follow specified instructions to correctly configure the new interface adapter board to the selected interrupt channel. This typically often involves the manual connecting of several tiny jumper blocks in the adapter circuit board. A clearly written instruction manual must be available for the knowledgeable user to follow when connecting the jumper blocks. Then, although not always the case, the user will likely need to add a software driver program to the computer system so that the added expansion can be successfully recognized by system. And, finally, the user must verify whether or not the expansion has been successfully incorporated into the system by conducting test procedures, for example, executing a diagnostics procedure.

Several disadvantages exist in this conventional process of expansion configuration. First of all, for many users it is difficult to determine what functional interface subsystems are or are not already installed in a computer system. For example, it is difficult for a user to distinguish, in an ISA computer system, between COM1, COM2, COM3 and COM4, as well as the I/O address assignments 3F8$h$, 2F8$h$, 3E8$h$ and 2E8$h$, and the interrupt request lines IRQ4 and IRQ3 normally shared among them. Then, it is frequently difficult for users not familiar with exposed circuit boards to actually perform the manual jumper settings. Attempting to perform the settings can result in frustration by the users, particularly novice users. And, due to the fact that most expansion interface adapters require the initiation of its functions by software drivers executed by the computer system, it is frequently necessary to prepare different versions of software drivers for various versions of operating systems. In the case of ISA computer systems, there will be various software driver programs for the various popular commercial operating systems. Moreover, the distribution of these software divers is frequently via floppy diskettes, which are vulnerable to damage and contamination by computer viruses.

It had therefore been proposed to add automatic configuration and diagnosis procedures in the expansion interface adapters in several of the more advanced microprocessor-based computer systems. This is frequently referred to as the concept of "plug and play". Ideally, a plug-and-play interface adapter board requires a user adding the board to a computer system only to open the computer system cabinet, find an unoccupied expansion bus slot in the computer to insert the board, and replace the system cabinet. After the interface adapter board is physically added to the system, the user needs only to turn on the power, and the newly added board, together with the computer system, automatically completes the process of configuring and diagnosing itself, and the added board can then function normally as expected. Since no adjustments of configuration jumper blocks are required, this is also referred to as the "jumperless" plug and play.

Such a jumperless plug-and-play concept was implemented in the EISA and MCA categories of computers more successfully than in the ISA computers, although the EISA and MCA computers constitute the minority of the systems in use today. For the ISA, as well as the VESA and PCI-enhanced ISA computers in use today, the plug-and-play functional peripheral interface adapter board is virtually unavailable yet. Some of the early plug-and play interface adapter boards still lack the ability of automatic self-diagnosis so that it can be readied before the operating system of the computer system is initiated. The ability of a functional peripheral interface adapter board to complete the process of automatic self-configuration and self-diagnosis before the operating system of the computer is loaded and initiated can free the board from the requirement to prepare the different versions of software driver programs for each operating system that may be employed in a computer system.

SUMMARY OF THE INVENTION

It is therefore an object of the present invention to provide a peripheral interface adapter for computer systems capable of automatic self-configuration and self-diagnosis without manual intervention by the user of the computer system.

It is another object of the present invention to provide a peripheral interface adapter for computer systems capable of completing the process of automatic self-configuration and self-diagnosis before the operating system of the computer system is loaded and initiated.

It is yet another object of the present invention to provide a peripheral interface adapter for computer systems capable of performing the process of automatic self-configuration and self-diagnosis that are independent of the operating system employed in the computer system.

The present invention achieves the above-identified objects by providing an interface adapter for installation onto the system expansion bus of computer systems, and in particular, micro-processor based computer systems. The interface adapter is accessible by the CPU of the computer system via the system expansion bus for implementing a self-configuration procedure for incorporation of the interface adapter means into the computer system. The implementation of the self-configuration procedure is conducted before the computer system initiates its operating system. The interface adapter includes a ROM memory device coupled to the system expansion bus for storing a control program portion. The control program portion includes an automatic self-configuration program routine accessible by the CPU via the expansion bus for implementing the self-configuration procedure before the computer system initiates the operating system. The interface adapter further includes an I/O register device coupled to the system expansion bus for setting up the I/O address range and interrupt channel assignments under control of the CPU via the system expansion bus when the CPU is executing the automatic self-configuration routine. The interface adapter also includes a detector coupled to the system expansion bus for detecting the utilization status of the interrupt channels available in the computer system when the CPU is executing the automatic self-configuration routine.

Other objects, features and advantages of the present invention will become apparent by way of the following detailed description of the preferred but non-limiting embodiment.

BRIEF DESCRIPTION OF THE DRAWING

The detailed description hereinbelow is made with reference to the accompanied drawings, wherein.

DETAILED DESCRIPTION OF THE PREFERRED EMBODIMENTS

Figure 1:
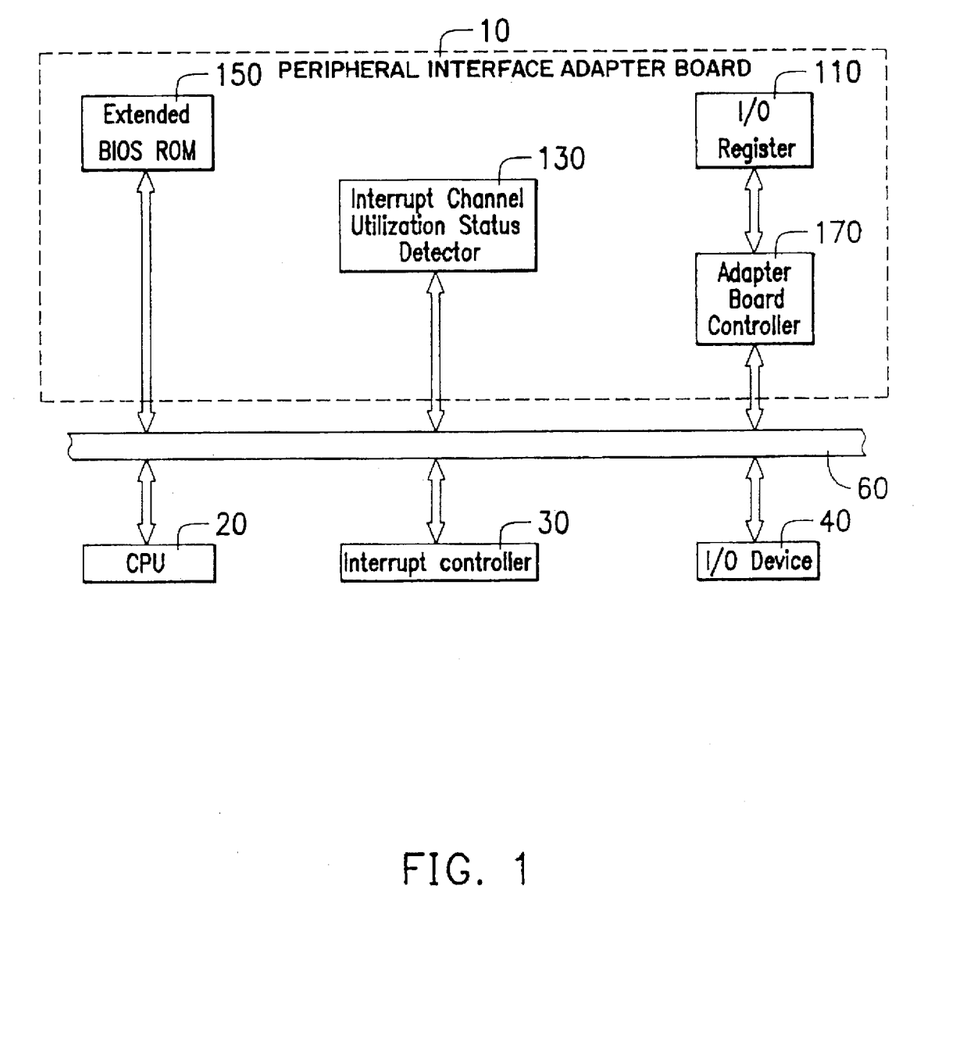
FIG. 1 is a schematic block diagram showing the functional configuration of a preferred embodiment of the present invention as residing on the expansion bus of the host computer system.

Referring to FIG. 1 of the drawings, a schematic block diagram shows the structural configuration of a preferred embodiment of the present invention as it is resides on an expansion bus of a host computer system. The optional peripheral interface adapter board, generally identified by the phantom line indicated by the reference numeral 10, can be inserted into an available slot of expansion bus 60 of a host computer system. CPU 20 of the host computer system, as well as interrupt controller 30 and I/O device 40 that normally constitute a computer system are also shown schematically to be attached to, or, may be able to be reached via the system via system expansion bus 60.

Other devices, such as main memory modules and disk storage controllers (not shown) may also be typically coupled to expansion bus 60.

Interface adapter board 10 includes memory device 150, usually a read-only memory (ROM) device, storing a portion of extended basic input/output system (BIOS) code, generally referred to as the extended BIOS. The extended BIOS as defined in an ISA computer system is the extension of the system BIOS code specifically reserved for peripheral devices added to the computer system. In accordance with the present invention, the extended BIOS code for the interface adapter board will include self-configuration and self-diagnosis code to be automatically executed by the system. Extended BIOS ROM 150 is accessible by CPU 20 via system expansion bus 60 when proper memory decoding logic (also not shown in the drawing) decodes and directs the access to ROM 150.

Interface adapter board 10 also includes I/O register 110. I/O register 110 is utilized to assign each of the same type of multiply-installed interface adapter boards to a different set of I/O addresses. For example, when more than one network interface card (NIC) for host system attachment to more than one network is required, the I/O address assignments of the NIC must be separated apart, although the NIC is normally assigned to a conventionally designated I/O address range. The same is applicable in the case of the installation of more than one small computer system interconnect (SCSI) controller adapter in the host computer.

When the automatic scheme of self-configuration and self-diagnosis of the present invention is applied to the NIC or SCSI controller case mentioned above, I/O register 110 built into an NIC or SCSI controller interface adapter board 10 will read a unique identification number assigned to every interface adapter board and stored in adapter board controller 170. As mentioned above, if there is a multiplicity of the same type of interface adapter board installed in the host system, these unique ID numbers will be identified by the system, and assigned to separate sets of I/O address ranges via I/O register 110. A detailed description of I/O register 110 and its operation will be described below.

Interface adapter board 10 also includes interrupt channel utilization status detector 130. As persons skilled in the art can appreciate, I/O peripheral devices 40 installed in expansion bus 60 of an ISA computer system employ interrupt request signals to request service by host CPU 20. Interrupt channel utilization status detector 130 inspects the utilization status of the interrupt request channels available in expansion bus 60 of the host system. The inspection is performed to avoid conflicts in the assignments of the interrupt request channels among installed interface adapter boards 10. A detailed description of interrupt channel utilization status detector 130 will be given below.

Figure 2:
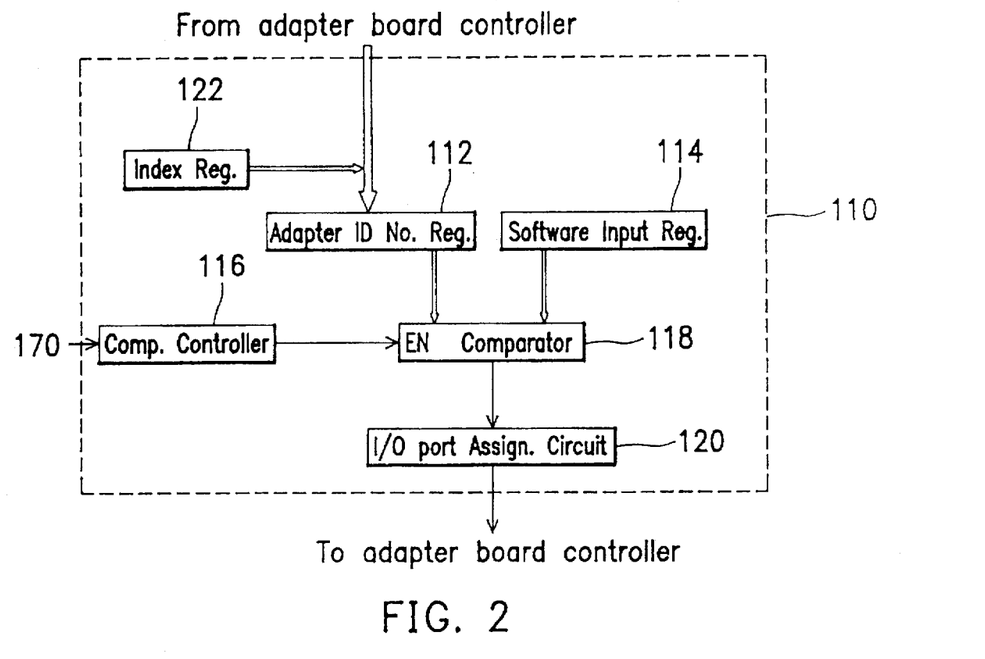
FIG. 2 is a schematic block diagram showing the functional configuration of the I/O register employed in the embodiment of FIG. 1.

Referring next to FIG. 2, a schematic block diagram shows the functional configuration of I/O register 110 employed in the embodiment of interface adapter board 10 of FIG. 1. As mentioned above, I/O register 110 is utilized to assign a unique set of I/O address for each interface adapter board 10 installed in expansion bus 60 of the host system. I/O register 110 includes adapter ID number register 112, software input register 114, compare controller 116, comparator 118, I/O port assignment circuit 120, and index register 122.

The function of dynamically assigning the applicable I/O address range for the one or more installed interface adapters of the same type as carried out by I/O register 110 is described below. First, a set of a few pre-arranged applicable I/O address ranges as offered by interface adapter board 10 itself is checked for each of their availability in the host system. In other words, each of the applicable I/O address ranges is checked to see whether or not any interface adapter board 10 installed in expansion bus 60 of has already occupied that particular address range. Compare controller 116 receives a control signal from adapter board controller 170 to strobe comparator 118 at its enable input EN. When it is decided that all the offered applicable I/O address ranges are available, comparator 118 is disabled, and I/O port assignment circuit 120 is allowed to assign one of the offered I/O address range as suggested by interface adapter board 10 itself for the use of board 10. This signifies the assignment of the I/O address range that is not occupied by other interface adapters that are already resident in the system.

Then, on the other hand, when it is decided that there is no conflict among the offered I/O address ranges with any of the existing interface adapter boards in the host system, comparator 118 will be enabled by compare controller 116. This allows comparator 118 to perform its comparison, as decided by adapter board controller 170, comparing the contents of adapter ID number register 112 and software input number register 114. The result of the comparison is utilized to control the output of I/O port assignment circuit 120. This process allows the separation of the multiple interface adapter boards 10 installed in expansion bus 60 of the host system.

Figure 3:
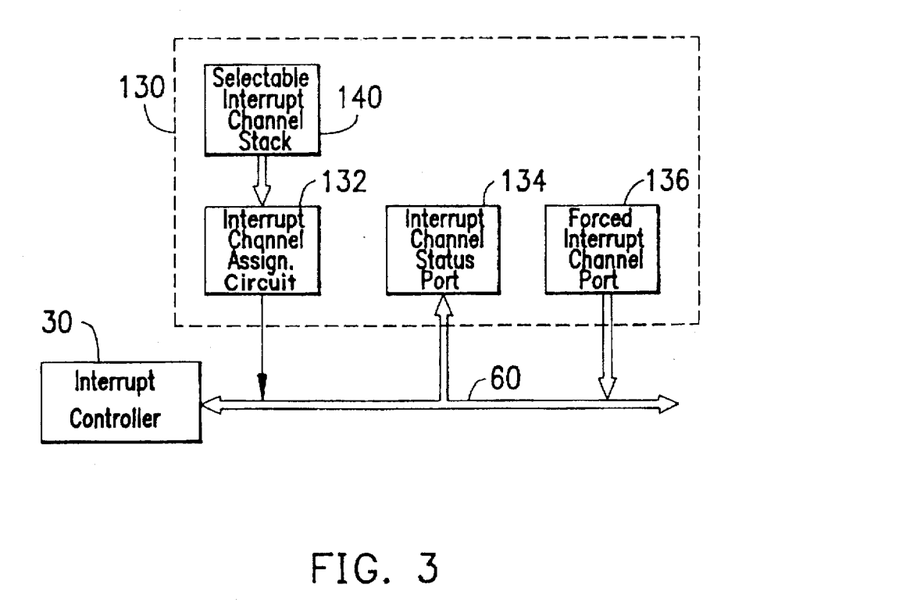
FIG. 3 is a schematic block diagram showing the functional configuration of the interrupt channel utilization status detector employed in the embodiment of FIG. 1.

Next, reference is directed to FIG. 3 of the drawing. FIG. 3 is a schematic block diagram showing the functional configuration of interrupt channel utilization status detector 130 in the embodiment of interface adapter board 10. As described above, interrupt channel utilization status detector 130 is utilized by interface adapter board 10 to inspect the utilization status of the interrupt request channels available in expansion bus 60 of the host system. Interrupt channel utilization status detector 130 includes interrupt channel assignment circuit 132, interrupt channel status port 134, forced interrupt channel assignment port 136, and selectable interrupt channel stack 140. The function of detecting the interrupt channel utilization status by detector 130, such as whether or not a particular interrupt channel is being occupied by any specific interface adapter, is described below.

First, CPU 20 of the host system, as shown in FIG. 1, is halted to allow for the take over of the system by the interrupt controller, for example, interrupt controller 30, which may be a 8259A programmable interrupt controller made by Intel Corporation in the case of an ISA computer system, and is located in the host system electronic circuitry that can be reached via expansion bus 60. This allows interface adapter board 10 equipped with interrupt channel utilization status detector 130 to conduct an examination process. The process is targeted at learning the assignment and utilization status of the entire set of interrupt channels available in the host system.

Then, interrupt channel status port 134 tests and examines each of the interrupt channels in the host system. Information regarding the assignment and use of all the interrupt channels can be gathered thereby. If during the examination procedure, it is found that the originally assigned interrupt channel for a particular interface adapter board 10 has already been occupied by some other interface adapter board, then interrupt channel assignment circuit 132 would set that interface adapter board to another interrupt channel and test again. That another interrupt channel is provided based on the pre-arranged set of interrupt channels stored in selectable interrupt channel stack 140. In other words, selectable interrupt channel stack 140 proposes a new interrupt channel, which is to be set up by interrupt channel assignment circuit 132 for testing. The offering of the new interrupt channel is based on the nature of the interface adapter board installed in expansion bus 60. After the interrupt channel utilization status check, interrupt controller 30 returns control over the system bus to CPU 20 of the host system.

Based on the functional description of I/O register 110 and interrupt channel utilization status detector 130, persons skilled in the art can appreciate the fact that other hardware means having different structural configuration but achieving similar functional abilities can be employed to replace register 110 and detector 130.

I/O register 110 and interrupt channel utilization status detector 130, which constitute the functional portions of interface adapter board 10 constructed in accordance with the preferred embodiment of the present invention, are essential in the process of automatic self-configuration and self-diagnosis to be described below.

Figure 4:
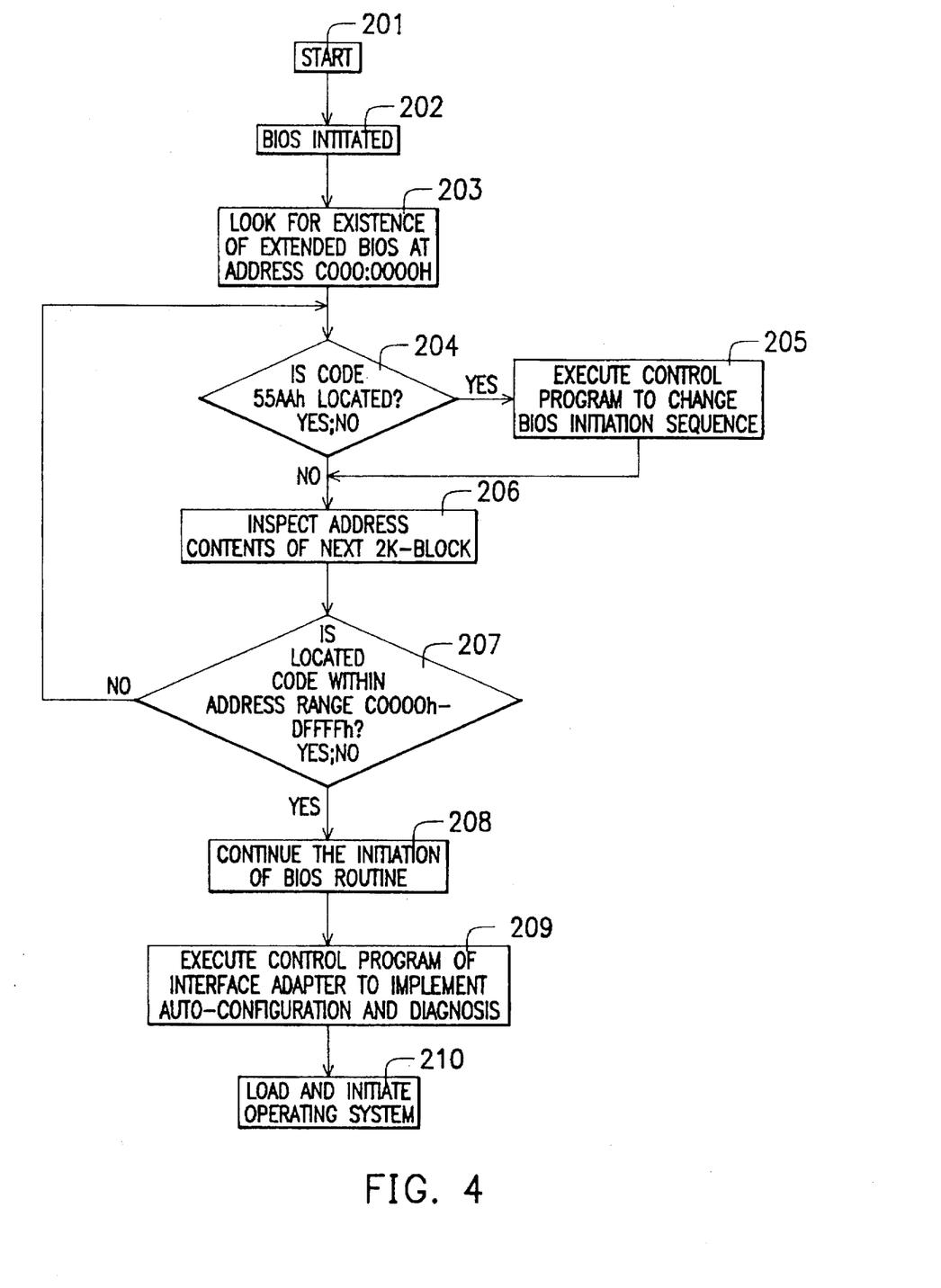
FIG. 4 shows the flow chart of a preferred embodiment of the control program for implementing the self-configuration and self-diagnosis procedures of the peripheral interface adapter.

Referring to FIG. 4 of the drawing, a flow chart of a preferred embodiment of the control program for implementing the automatic self-configuration and self-diagnosis procedures in the peripheral interface adapter is shown.

The procedure starts at step 201, which signifies the initiation of the system BIOS code at step 202 when an ISA computer is powered on. The execution of the BIOS code of the host system will, at a pre-determined stage, conduct a search in the designated memory address range for the existence of the extended BIOS codes. As is well known to persons skilled in the art, this searched memory address range in an ISA computer system is in the range C0000h to DFFFFh comprising the 20 least significant bits of the CPU address bus. The search begins by reading the memory contents in the range C0000h-DFFFFh in every 2K-blocks to see if there is any two consecutive bytes of data that reads "55, AA" expressed in hexadecimal, or, "01010101, 10101010" in binary. A located consecutive "55, AA" bytes of data signifies the possible existence of a segment of extended BIOS code. The system BIOS verifies the validity of the extended BIOS code by adding all the 8-bit data in the memory address range starting from the first byte "55" to the last byte determined by the first byte of data that immediately follows the second byte "AA". If all the data bytes are summed to modulo hexadecimal 100 h, then the validity of the extended BIOS code is verified.

Thus, if the existence of an extended BIOS code, as would be present in the ROM device of interface adapter board 10 in accordance with the present invention, is identified, the control program of FIG. 4 would than be transferred to step 205 to establish the diversion of the normal system BIOS procedure. This alteration of the normal BIOS routine, as is necessary for the implementation of the present invention, is described in further detail in FIG. 5.

On the other hand, if no extended BIOS code is identified to be in existence in that very 2K-byte block of memory address space of the host system, the control program proceeds to step 206 to prepare for the scan of the next 2K block of memory address range. Step 207 that follows checks to ensure that the scanned address range is in the designated extended BIOS range C0000h-DFFFFh. If there are still blocks of memory address range to be inspected, the control program would be returned to step 204 for the search of another piece of extended BIOS code. If the entire extended BIOS address range, that is, C0000hDFFFFh, is completed with scanning, then the control program proceeds to step 208 for the normal continuation of the system BIOS code.

After step 208 is completed, the control program proceeds to step 209 for the implementation of the automatic self-configuration and self-diagnosis procedures, as in accordance with the disclosure of the present invention. Then, after the self-configuration and self-diagnosis procedures are successfully concluded, the control program then proceeds to step 210 to initiate the loading of the operating system for the computer.

Based on the above-described outline of the flow chart of the control program, it is clearly distinguishable that the present invention proceeds with self-configuration and self-diagnosis procedures before the operating system is loaded and initiated. This is different from the normal practice in the conventional computer system when allowing the insertion of functional interface adapter boards. The conventional automatic configuration and/or diagnosis procedures are performed after the operating system is loaded and initiated. As already indicated earlier, this practice requires the use of different versions of configuration and diagnosis programs specifically prepared for different operating systems. Contrary to this prior art practice, the present invention implements the automatic self-configuration and self-diagnosis routines in the stage of system BIOS initiation, thereby eliminating the need for different versions of configuration and/or diagnosis programs for each category of the supported operating systems. In other words, the automatic self-configuration and self-diagnosis routines are included as part of the extended BIOS code of the functional interface adapter board to be added to the host computer for the required function expansion. By the time the automatic self-configuration routine successfully configures the interface adapter board itself in the system as a result of the execution of its included extended BIOS code, all the I/O address and interrupt channel conflict problems would be resolved automatically. If the automatic self-diagnosis routine is also included in the extended BIOS code and executed, the added interface adapter board can further be ensured of its readiness for the proper functioning in the host computer system.

Figure 5:
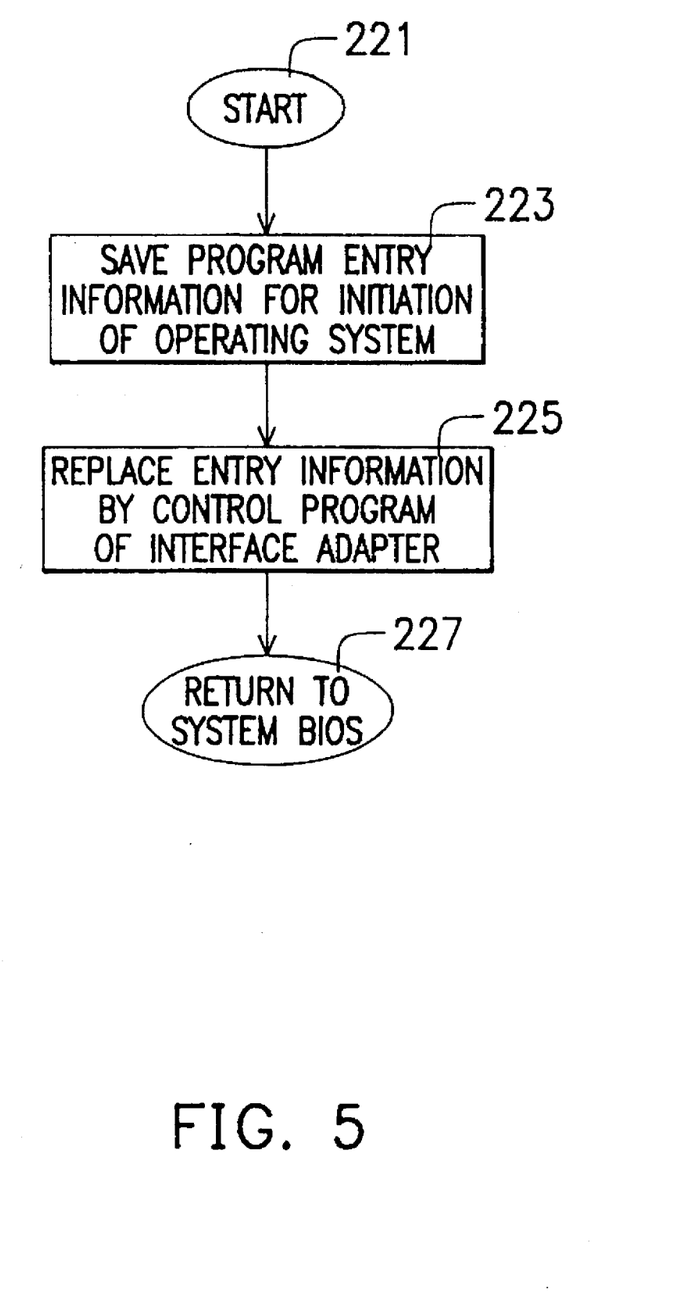
FIG. 5 shows the flow chart of the routine represented by the Execute Control Program To Change BIOS Initiation Sequence step in the control program.

FIG. 5 of details the routine of control program step 205 of FIG. 4, that is, the preservation of the program information for the otherwise initiation of the operating system for the host computer.

When the control program flow-charted in FIG. 4 transfers its program execution to the routine of FIG. 5 started at step 221, the control program can then proceed to store the system BIOS program information that was readied for the loading and initiation of the operating system. Since the present invention relies on the execution of the automatic self-configuration and self-diagnosis routines in the system BIOS wake up stage, the operating system loading and initiation can now be postponed and reserved until the self-configuration and self-diagnosis procedures are completed. This is done by replacing the program routine entry data of the operating system loading and initiation by the control program for the configuration and diagnosis of the present invention at step 225. Once the entry replacement is successful, the routine of FIG. 5 concludes and program flow returns to the main control program of FIG. 4 at step 227.

Figure 6:
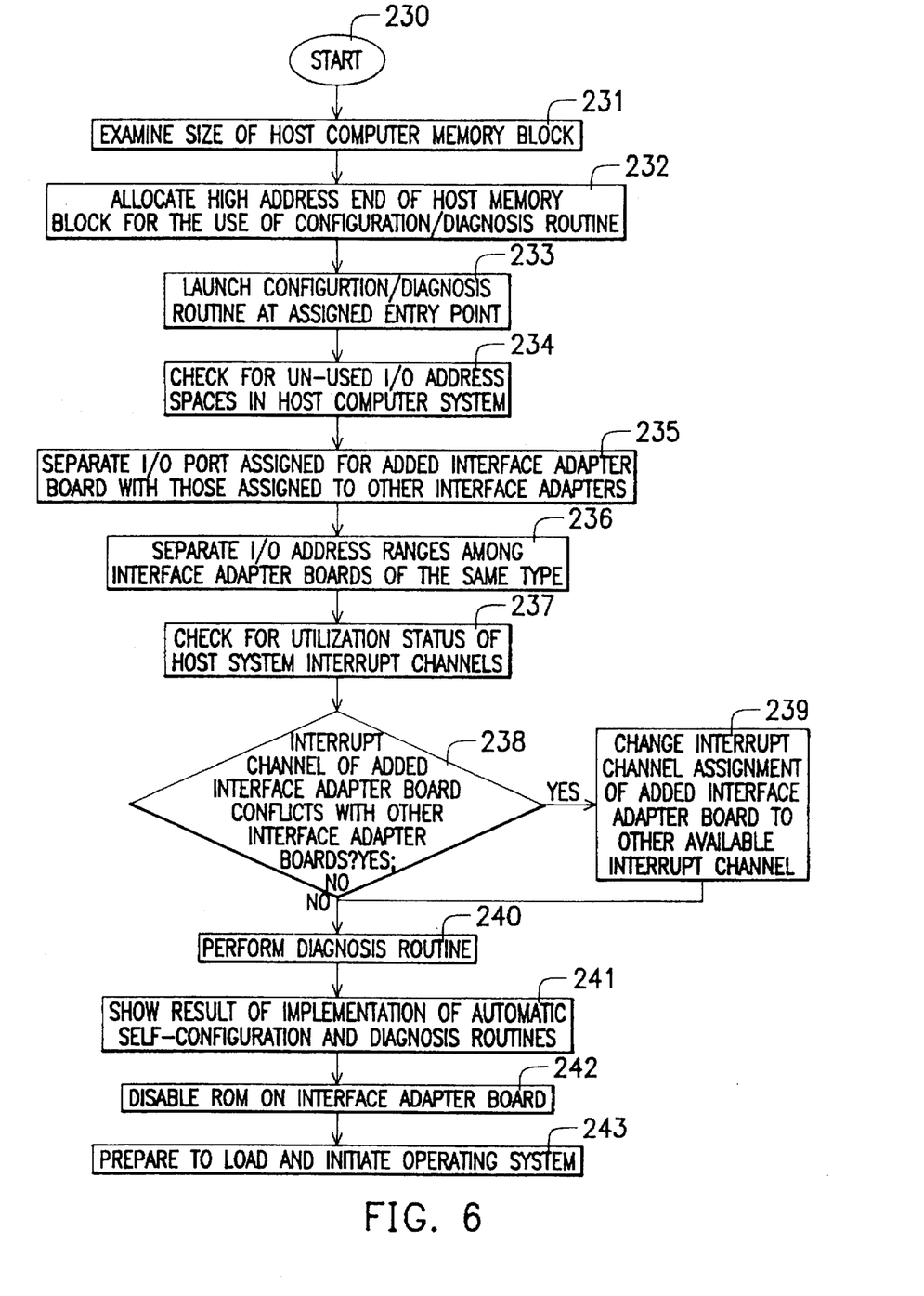
FIG. 6 shows the flow chart of the routine represented by the Execute Control Program of Interface Adapter to implement Auto-Configuration and Diagnosis step in the control program.

Next, FIG. 6 of the drawing details the control program step 209 of FIG. 4 in which the automatic self-configuration and diagnose procedures are performed for the setting up and testing of the functions of the interface adapter board to be added in the system expansion bus of the host computer system.

The automatic self-configuration and self-diagnosis routine for the interface adapter board in accordance with the present invention starts at step 230 of FIG. 6. In step 231, the self-memory size of the host computer system is examined. Then, in step 232, the high end of the addressable range of the memory block in the host system is allocated to store the control program from the ROM device aboard the interface adapter board for the automatic self-configuration and self-diagnosis procedure. Though, other memory spaces in the known memory size range can be utilized for the storage and execution of the control program of the present invention, provided that these memory spaces do not conflict with those other memory spaces reserved for the system BIOS use during the system BIOS initiation stage.

Next, in step 233, the control program that includes the automatic self-configuration and self-diagnosis routines can be executed by starting at the pre-determined entry point in the program memory as allocated above. Then, in step 234, the available I/O address space ranges in the host computer system are checked. Step 235 that follows then separates the I/O port assigned for the added interface adapter board with those I/O address space ranges already assigned to other interface adapter boards previously installed in the host computer system. This prevents the added interface adapter board conflicting with the already occupied I/O address range.

Then, in step 236, the self-configuration routine of the control program further separates the I/O address range of the added interface adapter from the I/O address ranges of other interface adapter boards of the same type. The multiple installation of interface adapter boards of the same type may be necessary in certain computer systems. For example, multiple network interface cards may be required to hook a computer system to more than one network employing different network hardware environments. Similar situations may be found where more than seven SCSI devices are to be attached to one host computer system.

Next, in step 237, the entire utilization status of the interrupt channels in the host computer is examined. The hardware implementation exemplifying this procedure had been previously described in relation to FIG. 3. Then, in step 238, it is tested to see if any conflict of the interrupt channel assignment exists in the entire system. If there is any conflict identified, the interrupt channel is then altered in step 239, and the program proceeds to step 240, where a routine performing the interface adapter board self-diagnosis is executed to test the functionality of the adapter board.

The results of the automatic self-configuration and self-diagnosis obtained at this stage is then displayed in step 241 for the inspection by the user of the host computer system. At this stage, the automatic self-configuration and self-diagnosis routines are completed, and the code contained in the ROM device aboard the interface adapter board can then be disabled, as depicted by step 242. This is desirable since under normal conditions an interface adapter board needs to be configured once when the board is installed in the host computer system for the first time. However, when the interface adapter board is relocated, or the system hardware configuration of the entire host computer system is altered, this routine can be enabled again to implement the configuration of board again.

Finally, after the automatic self-configuration and self-diagnosis procedures are completed as described above, the program execution can return control to the control program of FIG. 4 at step 243.

Figure 7:
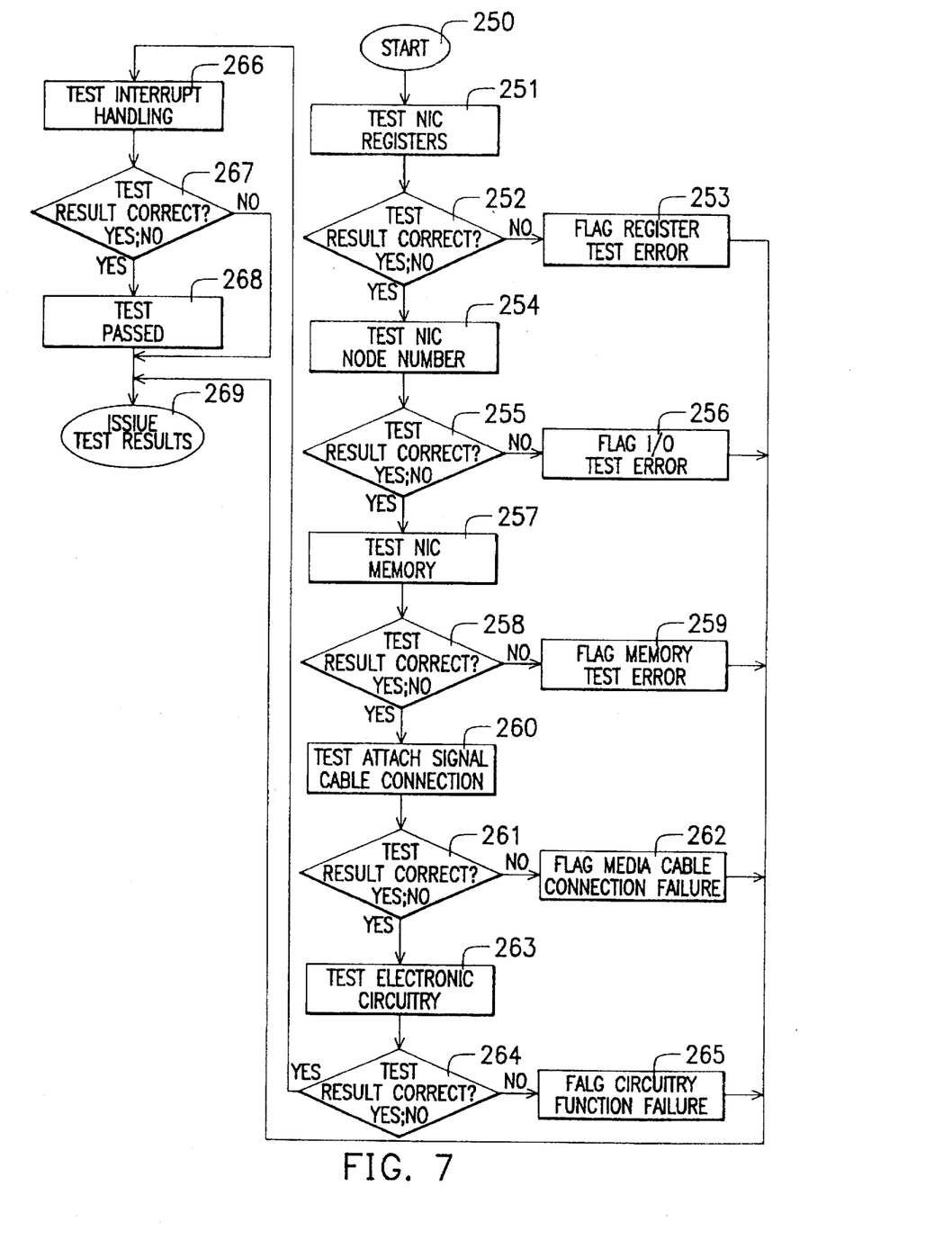
FIG. 7 shows the flow chart of the routine represented by the Perform Diagnosis Routine step in the control program.

FIG. 7 of the drawing shows the flow chart of the routine represented by step 240 in FIG. 6. This is a routine that exemplifies the automatic self-diagnosis procedure for the installed interface adapter board. The contents of a self-diagnosis routine would be dependent on the category of the interface adapter board used. The flow chart of FIG. 7 typifies a self-diagnosis routine for testing the functional integrity of the NE2000 category of EtherNet network interface card widely utilized in current installed computer systems, and is included herein for purpose of reference only. Typically, a self-diagnosis routine for an EtherNet NIC would include the testing of internal registers in the NIC, the input and output functions of the NIC, the memory blocks in the NIC, the connection of the signal transfer media, namely, the cable attached to the NIC, the functional integrity of the electronic circuitry of the NIC, and the interrupt handling of the NIC, etc . .

Thus, as clearly described above utilizing a preferred embodiment of the present invention for the example, an interface adapter for computer system ,and its automatic self-configuration and self-diagnosis process, features the full automatic configuration of the interface adapter board, without the intervention of the user. Jumper settings are not needed. The present invention implements a plug-and-play functionality not found in the ISA class of computer systems, with the special advantage of not needing an installation of software driver programs after a specific type of operating system is installed. An additional advantage of the present invention provides an automatic self-configuration and diagnosis process which is fully compatible with standards for the ISA category of microcomputer systems.

I claim:

1. An interface adapter for installation onto a system expansion bus of a computer system, said interface adapter being accessible by a central processing unit (CPU) of said computer system via said system expansion bus for implementing a self-configuration procedure for incorporation of said interface adapter into said computer system before said computer system initiates an operating system, said interface adapter comprising:

memory means coupled to said system expansion bus for storing a control program portion, said control program portion including an automatic self-configuration program module accessible by said CPU via said system expansion bus for implementing said self-configuration procedure before said computer systems initiates the operating system;

input/output register means coupled to said system expansion bus for setting up an input/output address range and interrupt channel assignments under control of said CPU via said system expansion bus when said CPU is executing said automatic self-configuration procedure, said register means comparing on said adapter board input/output address ranges of the interface adapter with input/output address ranges of any other interface adapters resident on said expansion bus to determine the existence of address range conflicts, and upon determination of an address range conflict, assigning an alternative input/output address range to said adapter board; and detection means coupled to said system expansion bus for detecting utilization status of interrupt channels available in said computer system when said CPU is executing said automatic self-configuration procedure, said detection means comparing on said adapter board an interrupt channel of the adapter with an interrupt channel of any other interface adapters resident on said expansion bus to determine the existence of an interrupt channel conflict and upon determination of said interrupt channel conflict assigning an alternative interrupt channel to said adapter board.

2. The interface adapter of claim 1, wherein said input/output register means includes a comparator for comparing a pre-designated input/output range with a software-generated input/output address range to determine input/output address range conflict status between said pre-designated input/output address range and an assigned, software generated input/output address range already occupied by other interface adapters resident on said system expansion bus, said input/output register means further including an input/output address assignment port for assigning an alternative input/output address range when said comparator determines an existence of an input/output address range conflict.

3. The interface adapter of claim 1, wherein said detection means includes an interrupt channel status port for comparing a pre-designated interrupt channel with a software-generated interrupt channel to determine interrupt channel conflict status between said pre-designated interrupt channel and an assigned, software-generated interrupt channel already occupied by other interface adapters resident on said system expansion bus, said detection means further including an interrupt channel assignment circuit for assigning an alternative interrupt channel when said interrupt channel status port determines an existence of an interrupt channel conflict.

4. The interface adapter of claim 1, wherein said control program portion includes an automatic self-diagnosis program module accessible by said CPU via said system expansion bus for implementing a self-diagnosis procedure before said computer system initiates the operating system, wherein said self-diagnosis procedure is implemented after implementation of said self-configuration procedure.

5. The interface adapter of claim 1, wherein said system expansion bus includes an industry standard architecture (ISA) bus.

6. The interface adapter of claim 5, wherein said memory means includes a read-only memory (ROM) device storing extended basic input/output system (BIOS) code that contains said control program portion.

7. The interface adapter of claim 1, wherein said system expansion bus includes a peripheral component interconnect (PCI) bus.

8. The interface adapter of claim 7, wherein said memory means includes a read-only memory (ROM) device storing extended basic input/output system (BIOS) code that contains said control program portion.

9. The interface adapter of claim 1, wherein said system expansion bus includes a video equipment standard association (VESA) bus.

10. The interface adapter of claim 9, wherein said memory means includes a read-only memory (ROM) device storing extended basic input/output system (BIOS) code that contains said control program portion.

11. A method of self-configuration for an interface adapter for installation onto a system expansion bus of a computer system, said interface adapter being accessible by a central processing unit (CPU) of said computer system via said system expansion bus for implementing a self-configuration procedure for incorporation of said interface adapter into said computer system before said computer system initiates an operating system, said method comprising the steps of:

initiating said computer system by applying power to said computer system;

performing a search in a memory means in said interface adapter for the existence of an extended basic input/output system (BIOS) code containing a control program portion, said control program portion including a self-configuration program routine accessible by said CPU via said expansion bus;

implementing said self-configuration program routine before said computer system initiates the operating system by setting up an input/output address range and interrupt channel assignments under control of said CPU via said expansion bus when said CPU is executing said self-configuration program routine, and detecting utilization status of the interrupt channels available in said computer system when said CPU is executing said self-configuration program routine, wherein on said board input/output address ranges and interrupt channels of the interface adapter are compared in a comparison, respectively, to input/output address ranges and interrupt channels of any other interface adapters resident on said expansion bus to determine the existence of address range conflicts and interrupt channel conflicts, and wherein said input/output address range and said interrupt channel are respectively assigned by said board based on said comparison as a unique input/output address range and interrupt channel in said computer system.

12. The method of self-configuration of claim 11, further including the step of implementing a self-diagnosis procedure after implementation of said self-configuration program routine and before said computer system initiates the operating system, said self-diagnosis procedure being implemented by a self-diagnosis program routine included in said control program portion and accessible by said CPU via said expansion bus.

13. The method of self-configuration of claim 11, wherein said system expansion bus includes an industry standard architecture (ISA) bus.

14. The method of self-configuration of claim 13, wherein said memory means includes a read-only memory (ROM) device storing extended basic input/output system (BIOS) code that contains said control program portion.

15. The method of self-configuration of claim 11, wherein said system expansion bus includes a peripheral component interconnected (PCI) bus.

16. The method of self-configuration of claim 15, wherein said memory means includes a read-only memory (ROM) device storing extended basic input/output system (BIOS) code that contains said control program portion.

17. The method of self-configuration of claim 11, wherein said system expansion bus includes a video equipment standard association (VESA) bus.

18. The method of self-configuration of claim 17, wherein said memory means includes a read-only memory (ROM) device storing extended basic input/output system (BIOS) code that contains said control program portion.

* * * * *